Inventor:
William F. Borgerd
Paul O. Pippel Atty.

United States Patent Office 2,751,761
Patented June 26, 1956

2,751,761

COMBINATION HEAT PUMP AND WATER HEATER

William F. Borgerd, Evansville, Ind., assignor, by mesne assignments, to Whirlpool-Seeger Corporation, a corporation of Delaware Application October 15, 1951, Serial No. 251,380

5 Claims. (Cl. 62—129)

This invention relates generally to a heat pump system and more specifically to a refrigeration system which operates to heat water and to selectively heat and cool the air within an enclosure.

One well known type of heat pump comprises a refrigeration system having two heat exchange units connected in series to a compressor with means for reversing the flow of refrigerant through the heat exchange units. When the refrigerant is flowing in one direction, one of the heat exchange units functions as an evaporator and air to be conditioned is passed thereover and cooled. By reversing the refrigerant flow, this same heat exchange unit becomes a condenser so that the air passing thereover is heated. In a heat pump of this type, duct means can be provided for passing the air from an enclosure into contact with the one heat exchange unit so that the enclosure will be heated or cooled, depending on the direction of the refrigerant flow.

The heat pump is a relatively new product for domestic use, and many changes and improvements are being made to better adapt the system to the needs of a home. It has been found that the heat pump can be combined with a water heater with very satisfactory results. This is a definite advantage over the furnace heating system which requires optional means for heating the water within a water heater during the summer months. By providing a water heater with a refrigerant coil which is connected to the compressor outlet of a heat pump system, the water will be quickly heated by the hot refrigerant gases flowing through the coil. Another improved feature for a heat pump is to place a secondary heat exchange unit in the basement of a home and connect it between the two heat exchange units of the refrigeration system. During the winter months, hot liquid refrigerant will be flowing through the secondary heat exchange unit and the basement will be warmed and the relative humidity will be lowered. When the heat pump has been reversed to the cooling cycle, the secondary heat exchange unit will operate as an evaporator and the air within the basement will be cooled, with moisture condensing onto the cold surfaces of the coil to effect dehumidification.

It is therefore a principal object of the invention to provide an improved heat pump particularly adaptable for heating and cooling a building.

Another object of the invention is to provide the heat pump with a refrigeration system having two heat exchange units connected in series to a compressor unit with means for reversing the flow of refrigerant through the units, whereby one of the heat exchange units may be used, either as an evaporator or a condenser, to condition the air within the building.

Another object of the invention is to provide the refrigeration system with a reversing valve which is connected between the heat exchange units and the compressor so that the direction of refrigerant flow can be reversed through the heat exchange units.

Another object of the invention is to provide the refrigeration system with a coil which is immersed in a water tank and connected into the system so that hot refrigerant will pass therethrough when the compressor is operating, whereby the water within the tank will be heated.

Another object of the invention is to provide means for running the compressor a short time after the air within the building has been properly conditioned in order to raise the high side temperature of the refrigeration system above normal operating conditions so that the water within the tank will be heated to a desired temperature.

Another object of the invention is to provide the refrigeration system with a basement heat exchange unit connected into the refrigeration system in such a manner that during the heating cycle, the unit operates to heat the air within the basement, and during the cooling cycle, the unit cools and dehumidifies the air.

Other objects and the nature and advantages of the invention will be apparent to those skilled in the art from the following description taken in conjunction with the accompanying drawings, wherein.

Figure 1:
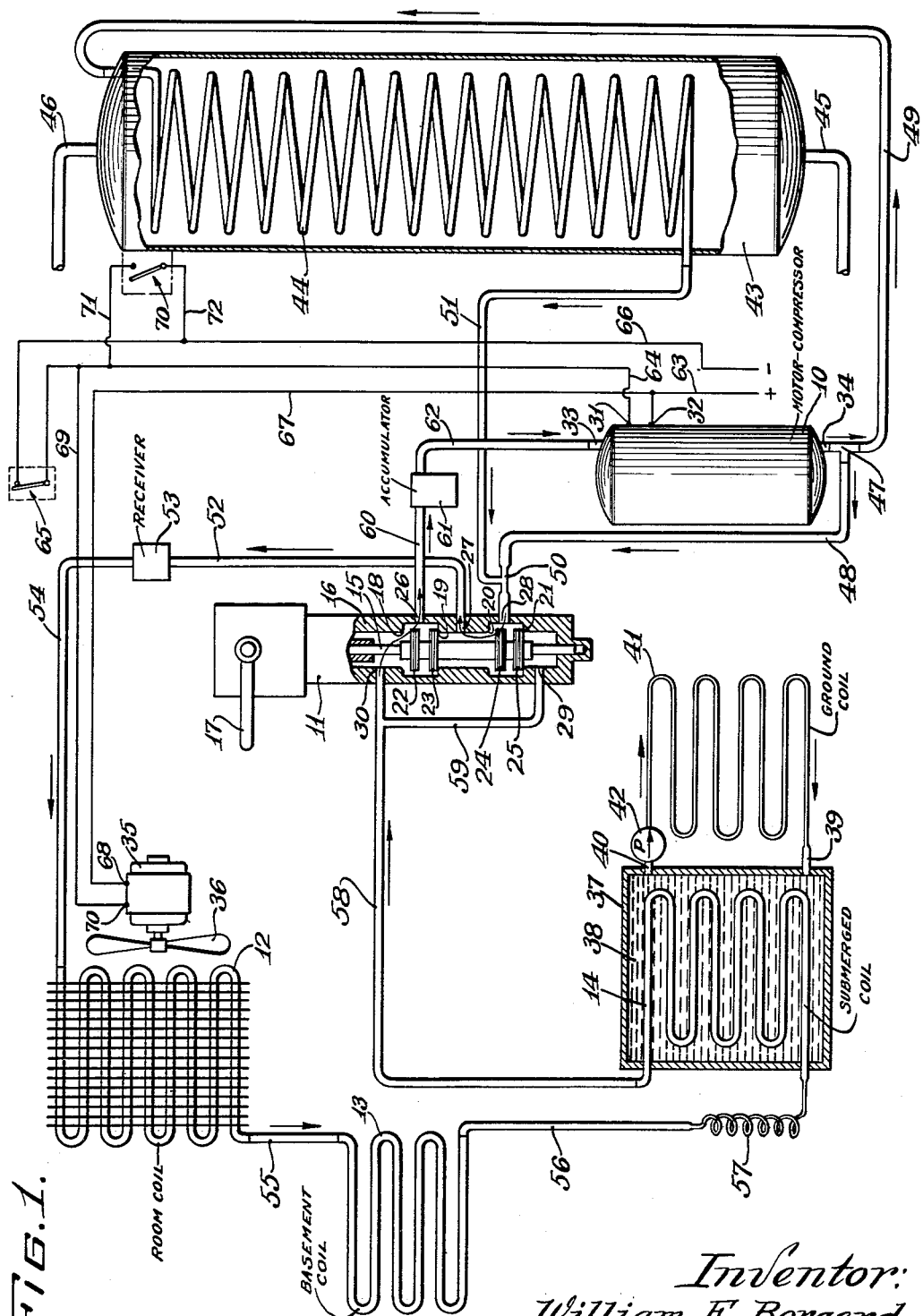
Figure 1 illustrates diagrammatically a heat pump system according to the invention showing the parts thereof in the heating cycle position with the flow of refrigerant being represented by arrows.

Referring to the drawings for a more detailed description of the invention, a refrigeration system is diagrammatically represented which comprises generally a motor-compressor unit 10, a reversing valve 11, a room heat exchange unit 12, a basement heat exchange unit 13, and a submerged coil 14. The reversing valve is provided with a valve stem 15 which is slidably secured within the valve casing 16. The upper end of the valve stem 15 is connected to a lever 17 which may be rotated to impart longitudinal movement to the valve stem. Valve casing 16 is provided with four valve seats 18, 19, 20, and 21 against which valve heads 22, 23, 24, and 25 are adapted to seat. The valve heads are secured to valve stem 15 in spaced relationship so that valve heads 22 and 24 will seat against valve seats 18 and 20 respectively when the valve stem is moved in one direction, and valve heads 23 and 25 will seat against valve seats 19 and 21 respectively when the valve stem is moved in the opposite direction. The valve heads control the flow of refrigerant through five outlet ports 26, 27, 28, 29, and 30 as will be explained hereinafter.

The motor-compressor unit 10 comprises an electric motor and a compressor hermetically sealed within an outer casing. Electrical terminals 31 and 32 are provided for the electric motor and a refrigerant inlet 33 and outlet 34 are provided for the compressor.

It is contemplated that the finned tube room coil 12 either be located in an enclosure or room which is to be conditioned, or be connected to the rooms of a building by suitable ducts. An electric motor 35 is provided with a fan 36 which will circulate room air into heat exchange relation with the surface of the coil 12. The basement coil 13 can be positioned within the basement of the building or be connected thereto by ducts with fan means (not shown) for circulating the air from the basement into contact with the coil. The submerged coil 14 is enclosed by a casing 37 and is surrounded by a heat exchange liquid 38. The casing is provided with an inlet 39 and outlet 40 to which a coil 41 is connected with a pump 42 for circulating the liquid 38 therethrough. It is contemplated that coil 41 be buried in the ground at a depth whereby the temperature of the earth surrounding the ground coil will remain constant throughout the year.

Reference numeral 43 designates a water tank in which a refrigerant coil 44 is disposed. The lower portion of the tank 43 is provided with a water inlet 45 which may be connected to a suitable water supply (not shown). A water outlet 46 is connected into the upper portion of the tank 43 and it is contemplated that the water outlet be connected to the hot water faucets of the building in the usual manner whereby hot water from the tank can be supplied to various parts of the building.

Figure 4:
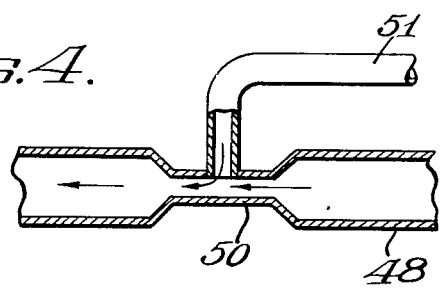
Figure 4 is an enlarged cross sectional view of a portion of the heat pump system.

Motor-compressor outlet 34 is connected to elbow 47 which has one leg joined to conduit 48 and the other leg joined to conduit 49. Tank coil 44 is joined to one end of conduit 49, the opposite end of which is connected to a reduced portion 50 of conduit 48 by conduit 51 as best seen in Figure 4. This reduced portion 50 acts as a venturi throat to produce a slight suction for pulling refrigerant from conduit 51. Conduit 52 connects outlet port 27 to a volume equalizing receiver 53. Room coil 12 is connected to the receiver 53 by conduit 54 and to the basement coil 13 by conduit 55. The basement coil 13 and submerged coil 14 are connected by a conduit 56 and capillary restrictor tube 57. The submerged coil 14 is connected to outlet port 30 by conduit 58 and to outlet port 29 by conduit 59. Conduit 60 connects outlet port 26 to an accumulator 61 and conduit 62 connects compressor inlet 33 to the accumulator. It is contemplated that accumulator 61 be a combination refrigerant strainer, drier and accumulator.

Terminal 32 of the motor-compressor unit 10 is connected to a suitable power source by conductor 63, and terminal 31 is connected to the power source by conductor 64, switch 65 and conductor 66. Conductor 67 connects terminal 68 of fan motor 35 to conductor 63 and conductor 69 connects terminal 70 to conductor 64 so that both the fan motor 35 and motor-compressor unit 10 will be energized when switch 65 is closed. A second switch 70 is connected into the circuit of motor-compressor unit 10 by conductors 71 and 72, whereby the circuit to the motor-compressor unit can be completed by closing the second switch even though switch 65 is open. The switches 65 and 70 can be either manually operated or automatically operated.

Figure 1 of the drawing shows the heat pump operating to heat the building. Lever 17 has been rotated to a horizontal position whereby valve stem 15 has been moved downwardly so that valve heads 23 and 25 are seated against valve seat 19 and 21. Switch 65 has been closed and the circuit to motor-compressor unit 10 has been completed through conductor 63, conductor 64, switch 65, and conductor 66. Fan motor 35 is also energized through the circuit comprising conductor 63, conductor 67, conductor 69, conductor 64, switch 65, and conductor 66. Part of the compressed refrigerant gases flows through conduit 48 from the motor-compressor unit 10, and part flows through conduit 49 into coil 44. As the hot compressed refrigerant gases pass through coil 44, the water within tank 43 will be heated and part of the refrigerant will be condensed. From the coil 44, the refrigerant flows through conduit 51 into conduit 48, and the venturi throat will produce a slight suction to aid in pulling the refrigerant liquid and gases from the coil and to insure active circulation through the coil.

The high pressure refrigerant passes from conduit 48 through port 28, over valve seat 20 and out valve port 27 into conduit 52, which conveys it into receiver 53. From the receiver 53, the refrigerant is carried by conduit 54 to room coil 12 where it will be condensed by the room air being circulated into contact with the coil by fan 36. The condensed refrigerant then flows through conduit 55 into basement coil 13, where it will be further cooled by the basement air circulating thereover, then through conduit 56 and restrictor tube 57. As the refrigerant passes through the restrictor tube 57, it changes from a high pressure to a low pressure, and then it flows through submerged coil 14. Since heat exchange liquid 38 is at a higher temperature than the refrigerant, heat will be absorbed thereby and the refrigerant will be vaporized. These vapors then pass through conduit 58, valve port 30, valve port 26, and conduit 60 into the combination accumulator, strainer and drier 61. The refrigerant vapors are then pulled into the motor-compressor unit 10 through conduit 62 to be recompressed and recirculated through the system.

In a heat pump system of the character being described, the high side temperature will probably range from 110 to 125 degrees Fahrenheit and the air within the building will be properly heated by room coil 12. Basement coil 13 will heat the air within the basement, and by this arrangement the basement will be heated with no increase in main motor operating power. It will also increase the heating capacity of the heat pump by the quantity of heat the basement coil emits. This increase in overall heating capacity will be greatest when the basement air is abnormally low in temperature. In other words the basement coil delivers the most heat when this heat is needed. The water within tank 43 will be heated to approximately 120 degrees Fahrenheit by the coil 44. When the air within the building has been heated to a desired temperature, switch 65 will be opened and the motor-compressor unit 10 and fan motor 35 will be stopped.

Figure 3:
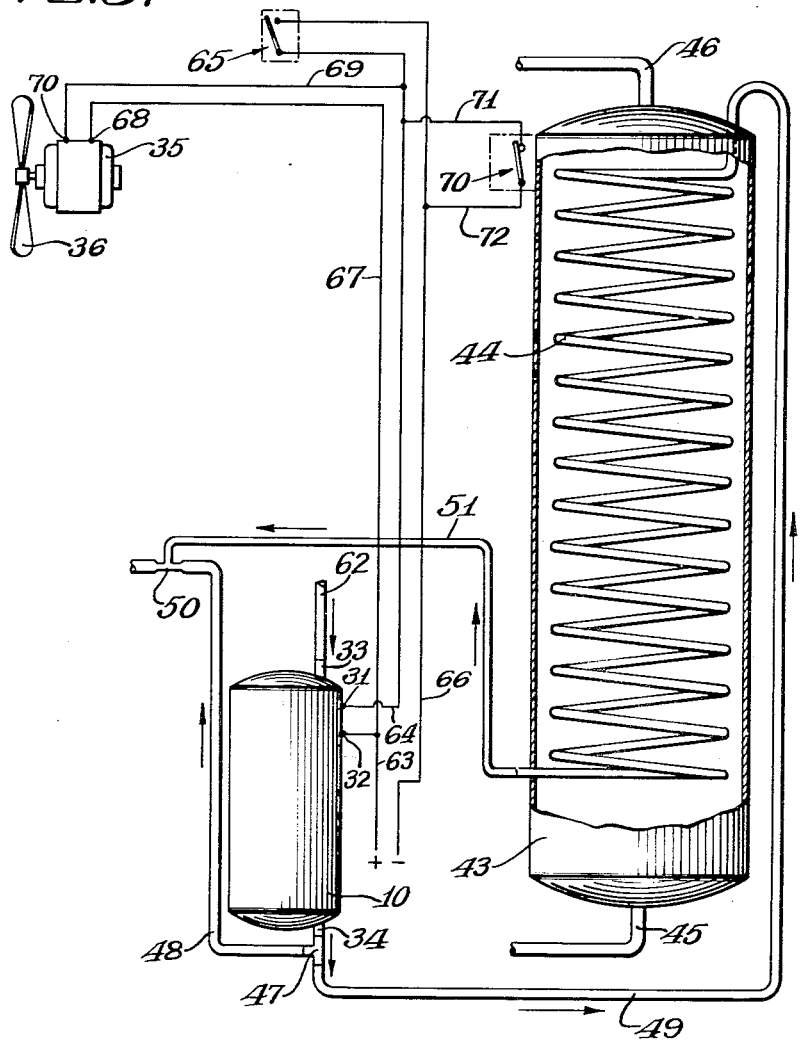
Figure 3 is a diagrammatic view of a portion of the heat pump system operating to heat the water in the water tank.

For satisfactory home use, the water withdrawn through outlet 46 should be around 145 degrees Fahrenheit. Since the water within tank 43 will only be heated to approximately 120 degrees during the heating cycle of the refrigeration system, the water temperature can be boosted by operating the motor-compressor 10 for a few minutes at the end of each regular running cycle. This is accomplished by closing switch 70 which energizes the motor-compressor motor through the circuit comprising conductor 63, conductor 64, conductor 71, switch 70, conductor 72, and conductor 66, as seen in Figure 3 of the drawings. The refrigerant will circulate through the system in the same manner as during the heating cycle, but since fan 36 is not operating, only about one-third to one-half of the full capacity of the compressor will be used because of the limited size of the tank coil 44. This will raise the head pressure rapidly, and since a mixture of liquid and gas will be delivered to the capillary tube 57, this high head pressure will be maintained. When the high side pressure has reached approximately 150 degrees Fahrenheit, switch 70 will be opened. The increased temperature of the tank coil 44 will heat the water within tank 43 to the desired temperature.

Figure 2:
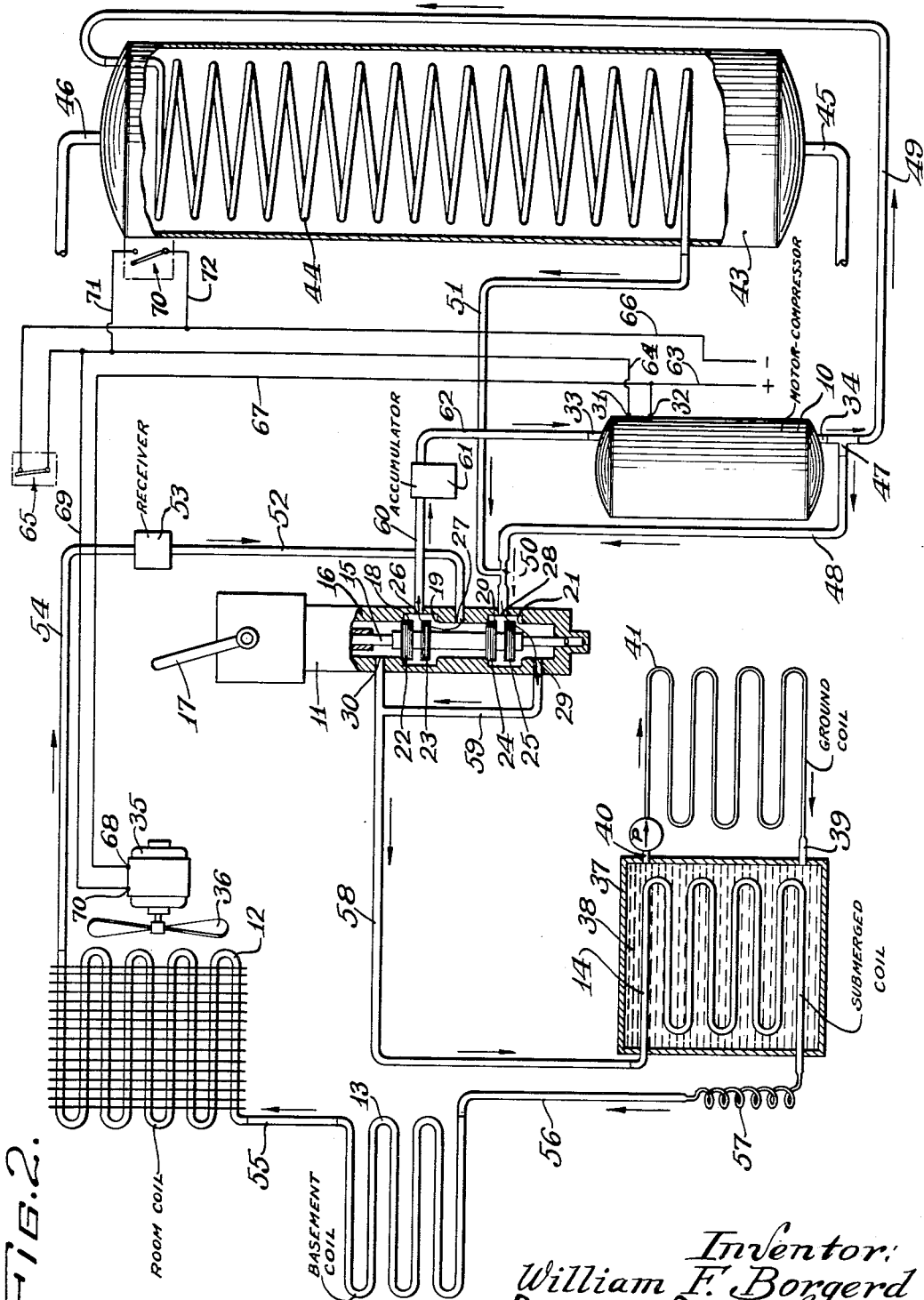
Figure 2 is a diagrammatic view of the heat pump system operating on the cooling cycle with the refrigerant flow being represented by arrows.

By referring to Figure 2, the lever 17 of reversing valve 11 has been rotated and the heat pump is changed from the heating cycle of Figure 1 to the cooling cycle shown in Figure 2. Valve heads 23 and 25 have been unseated and valve heads 22 and 24 are now in contact with valve seats 18 and 20 respectively. Switch 65 has been closed so that the circuits to motor-compressor unit 10 and fan motor 35 are completed as explained above. The compressed refrigerant vapors flow through elbow 47 and divide, part passing through conduit 48 and part passing through conduit 49 into tank coil 44. The water within the tank 43 is heated by coil 44, and the partially cooled refrigerant from the coil 44 flows through conduit 51 into Venturi throat 50 of conduit 48. The refrigerant vapors then pass through valve port 28, valve port 29, conduit 59, and conduit 58 to the submerged coil 14 where the heat exchange liquid 38 cools and condenses the refrigerant within the coil. After leaving coil 14, the refrigerant liquid is forced through the capillary tube 57 and then enters conduits 56 at a lower pressure, and as it passes through the basement coil 13 and room coil 12, it is evaporated by the heat absorbed from the air. The refrigerant vapors are then returned to the motor-compressor unit 10 through conduit 54, receiver 53, conduit 52, valve port 27, valve port 26, conduit 60, accumulator 61, and conduit 62.

During the cooling cycle, room coil 12 and basement coil 13 will both be functioning as evaporators. Basement coil 13 will cool and dehumidify the air within the basement. After room coil 12 has cooled the room air to a desired temperature range, switch 65 will be opened in order to stop fan motor 35 and motor-compressor unit 10. The water within tank 43 will be heated by coil 44 during the cooling cycle and will be available for use from outlet 46. Since the high side temperature of the refrigeration system will be approximately 10 degrees Fahrenheit lower than during the heating cycle, it is desirable to close switch 70 after switch 65 is opened, as illustrated in Figure 3, in order to run the motor-compressor unit 10 without running motor 35, whereby the high side temperature of the refrigeration system is increased to approximately 150 degrees Fahrenheit, as explained heretofore. In this way the water within tank 43 will be maintained at approximately 145 degrees Fahrenheit during the cooling cycle as well as during the heating cycle.

During a few months out of the year, generally in the spring and fall, there are days when neither heating nor cooling of the room air is required. Since hot water is still required during such periods, it is contemplated that switch 70 be used to operate the motor-compressor unit 10. In this way the heat pump will operate to heat the water within tank 43, and since fan 36 is not operating, the air within the rooms of the building will not be affected. It is contemplated that switch 70 be closed when the high side temperature near the water tank 43 has fallen to 120 degrees Fahrenheit, and then opened when the temperature reaches approximately 150 degrees Fahrenheit.

It is apparent from the foregoing description that a heat pump system is disclosed which will operate to condition the air within a building and to heat water within a water tank. In this system, two important units of the home are combined into one assembly, whereby the weight, cost and operating expense of the units are reduced. The heat pump disclosed will operate to heat the water in the water tank in less time and at about one-half the cost as compared with a conventional type electrical heater. The basement coil will operate to maintain the temperature and humidity of the basement air within a desired range with no increase in operating power.

While the invention has been shown in but one form, it will be obvious to those skilled in the art that it is not so limited but is susceptible of various changes and modifications, without departing from the spirit thereof, and it is desired, therefore, that only such limitations shall be placed thereupon as are imposed by the prior art or as are specifically set forth in the appended claims.

What is claimed is:

1. A refrigeration system comprising a first heat exchange unit and a second heat exchange unit connected in series to a compressor, said system being charged with a refrigerant, reversing means connected between said compressor and said heat exchange units whereby the flow of refrigerant can be reversed through the heat exchange units, a coil positioned in heat exchange relation with a water tank, the compressor's outlet being connected to said reversing means by a conduit which is provided with a reduced portion, one end of said coil being connected to said conduit between said reduced portion and said compressor's outlet so that part of the compressed refrigerant will flow therethrough, the opposite end of said coil being connected to the reduced portion of said conduit whereby a suction is created which aids in pulling the refrigerant through the coil.

2. A refrigeration system comprising a first heat exchange unit and a second heat exchange unit connected in series to a compressor, said system being charged with a refrigerant, a coil positioned in a water tank in heat exchange relation with the water therein, the compressor's outlet being connected to said heat exchange units by a conduit which is provided with a reduced portion, one end of said coil being connected to said conduit between said reduced portion and said compressor's outlet so that part of the compressed refrigerant will flow through the coil the opposite end of said coil being connected to the reduced portion of said conduit whereby a suction is created which aids in pulling the refrigerant through the coil.

3. In a heat pump for conditioning the air within a building, a refrigeration system comprising a first heat exchange unit, a second heat exchange unit and a third heat exchange unit, said heat exchange units connected in series to a compressor, a refrigerant flowing within said system, a metering device connected between said second heat exchange unit and said third heat exchange unit, means for reversing the flow of refrigerant for heating and cooling cycles so that said first and second heat exchange units will operate as evaporators and said third heat exchange unit will operate as a condenser during the cooling cycle, and so that said first and second heat exchange units will operate as condensers and said third heat exchange unit will operate as an evaporator during the heating cycle, said first heat exchange unit being in heat exchange relation with the room air of the building, said second heat exchange unit being in heat exchange relation with the basement air of said building, and a coil positioned in heat exchange relation with a water container, said coil being connected in said system so that a portion of the compressed refrigerant from the compressor will flow through the coil before being conveyed through said heat exchange units so that said coil operates as a condenser only.

4. In a heat pump for conditioning the air within a building, a refrigeration system comprising a first heat exchange unit, a second heat exchange unit and a third heat exchange unit, said heat exchange units connected in series to a compressor, a refrigerant flowing within said system, a metering device connected between said second heat exchange unit and said third heat exchange unit, means for reversing the flow of refrigerant for heating and cooling cycles so that said first and second heat exchange units will operate as evaporators and said third heat exchange unit will operate as a condenser during the cooling cycle, and so that said first and second heat exchange units will operate as condensers and said third heat exchange unit will operate as an evaporator during the heating cycle, said first heat exchange unit being in heat exchange relation with the room air of the building, said second heat exchange unit being in heat exchange relation with the basement air of said building, a coil positioned in heat exchange relation with a water container, said coil being connected in said system so that a portion of the compressed refrigerant from the compressor will flow through the coil before being conveyed through said heat exchange units so that said coil will operate as a condenser only, fan means for circulating said room air over said first heat exchange unit, and manual means selectively operable to one position for operating the compressor alone and to another position for operating the compressor and the fan means simultaneously.

5. In a heat pump as claimed in claim 3, a second coil positioned in a heat exchange relation with the ground without said house, and means for connecting said second coil in a heat exchange relation with said third heat exchange unit.

(References on following page)

References Cited in the file of this patent

UNITED STATES PATENTS

| | | |
|---|---|---|
| 1,874,803 | Reed | Aug. 30, 1932 |
| 2,135,285 | Gibson | Nov. 1, 1938 |
| 2,241,060 | Gibson | May 6, 1941 |
| 2,241,070 | McLenegan | May 6, 1941 |
| 2,351,140 | McCloy | June 13, 1944 |
| 2,575,325 | Ambrose | Nov. 20, 1951 |
| 2,589,384 | Hopkins | Mar. 18, 1952 |

FOREIGN PATENTS

| | | |
|---|---|---|
| 638,947 | Great Britain | June 21, 1950 |
| 949,365 | France | Aug. 29, 1949 |